United States Patent Office

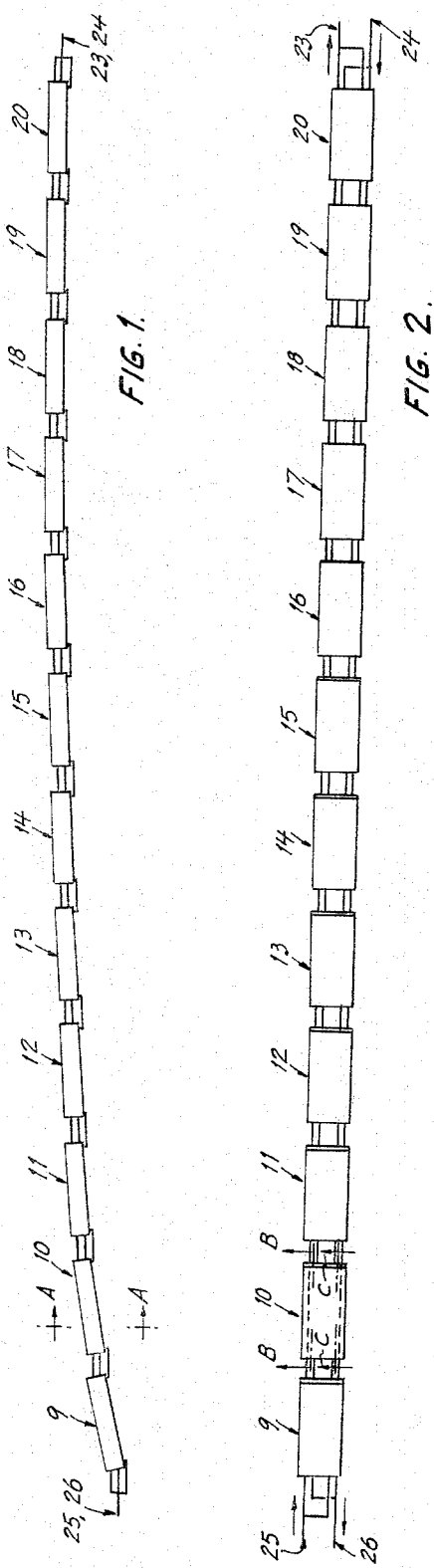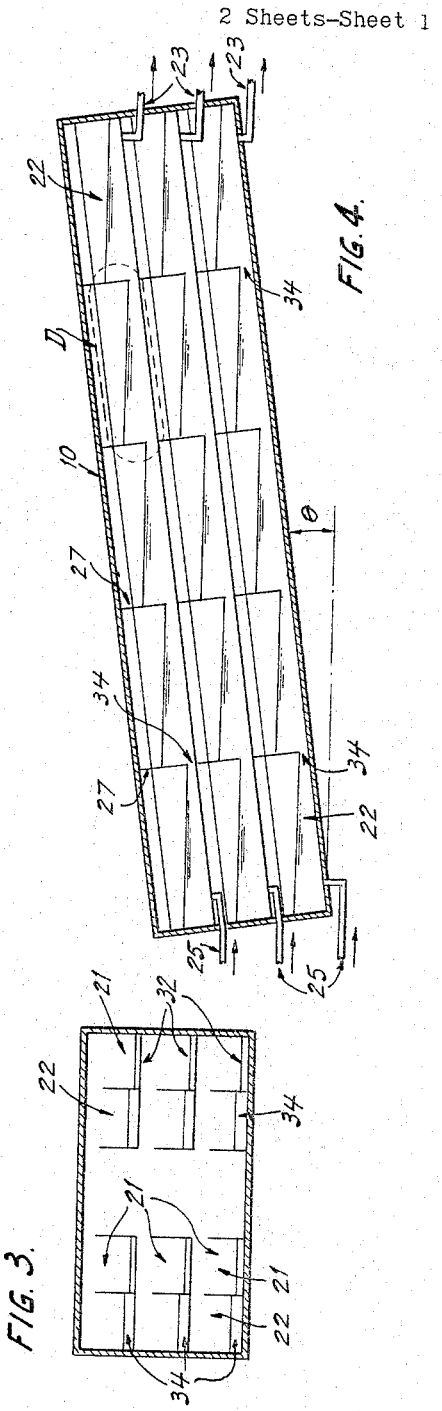

3,337,419
Patented Aug. 22, 1967

3,337,419
MULTIPLE FLASH EVAPORATOR-CONDENSER
Abraham Kogan, 35a Trumpeldor Ave.,
Neve Shaanan, Haifa, Israel
Filed May 18, 1964, Ser. No. 368,202
7 Claims. (Cl. 202—173)

The present invention is directed to apparatus for purifying water, and more particularly, to equipment of value in the desalination of water to render it potable and normally usable in industry and agriculture.

An analysis of sea water conversion processes by multi-flash distillation reveals that the cost of specific energy input (e.g. cost of steam necessary for the conversion of 1000 gallons of water) can be decreased steadily by increasing the number of stages in the plant. But the increase in the number of stages has an adverse effect upon the capital investment. The practical number of stages is thus determined by compromising between these two conflicting tendencies.

Whenever a way can be indicated, by which the design and construction of the stages is simplified and their cost decreased, a higher number of stages becomes adequate for optimum economic design, and the total cost of converted water decreases.

There is still another consideration which indicates an important advantage connected with the increase in number of stages of a conversion plant. When brine penetrates from one stage to another under a pressure difference, a fraction of the flow is flashed off instantly into vapor, so as to lower the temperature of the remaining liquid stream to a point corresponding to the lower pressure. This process is irreversible and chaotic in nature. Vapor is produced not only at the free surface of the stream. It is also generated in the bulk of the fluid, below the free surface, and it erupts upwards in the form of bubbles, which burst in the atmosphere above the brine stream. The thin film which forms the bubble wall is thus transformed into a fine mist of salty water, which may be carried with the vapor towards the condensing surfaces, affecting the salt content of the converted or distilled and condensed water. This is one of the major difficulties encountered, e.g., in proposed distillation processes based on the exploitation of the temperature difference occurring naturally between different layers of ocean water.

An increase in the number of stages through which a given drop in brine temperature is obtained results in a corresponding decrease in temperature drop per stage. The flashing process becomes thus less violent and a smaller amount of salty mist is liberated thereby.

The object of this invention is the development of a new and very simple method of design of flash distillation apparatus, by which very low temperature drops between stages can be easily achieved. The main simplification is obtained by utilizing the vapor pressure difference between stages as a driving force for the maintenance of flow of brine from the hotter stages to the cooler stages. The necessity of pumps for the pumping of brine between stages is thus partially or completely eliminated.

Another object of my invention is to develop a distillation process in which the amount of mist formation during vapor flash-off is reduced by increasing economically the number of stages for a given brine temperature drop.

Other objects of my invention are improvements in the flash distillation process which will become apparent from the detailed description of it.

In former inventions (Israel patent application Nos. 19,320 and 19,321, both of May 30, 1963), I have described a flash distillation process in which streams of brine and of converted water flow in adjacent open channels in a common enclosure, forming a stage, in opposite directions, and vapor flashing off from the warmer brine stream condenses at the free surface of the converted water stream. The brine emerges from the stage cooler and more concentrated and proceeds by gravity to the next lower stage, while the converted water emerges at the opposite end warmer and is pumped to the next higher stage.

In my present invention, in order to utilize the variation of vapor pressure with temperature as a driving force for water pumping, the open channels are arranged within an elongated cylindrical enclosure in essentially parallel directions, at an appropriate angle of inclination. The volume of the enclosure is partitioned by a number of plane plates normal to its longitudinal axis into a corresponding number of chambers, which will form the separate stages of a pile. The open channels, or trays, penetrate through appropriate holes in the transversal plates. The consecutive stages are thus hermetically sealed off from each other, except for gaps of definite height remaining at the location of penetration of trays through the transversal plates. During operation of the plant, these gaps are also sealed off by the flows of brine and of converted water, respectively.

The gaps in the trays which are to carry the converted water stream are adjusted so as to be sealed off by a stream of the desired rate, without spilling over the tray borders.

After admission of cold converted water at the upper end of these trays and establishment of the converted water stream, warm brine is introduced to the lower ends of the brine trays. Its level rises in the first stage (lowest stage) until the gaps between the first and second stages are completely sealed by the flow. At this moment a pressure differential is developed between the first stage and the rest of the enclosure, due to the difference between brine temperature in the first stage and water temperature in the higher stages.

Under the influence of this pressure difference, the level of brine remains stationary in the first stage and rises in the second stage, until it ultimately reaches the second set of gaps in the brine trays, and seals them off.

This causes the production of a pressure differential between the second chamber and the remaining higher chambers, so that the brine is further pumped against gravity, by action of vapor pressure difference, into the third stage.

This process continues to develop until the brine reaches the highest stage, and leaves the upper end of the cylindrical enclosure.

In the steady state flow, the temperature of brine decreases in small steps from stage to stage, while the temperature of converted water increases continuously in its direction of flow, these variations in temperature being maintained by the flashing off of definite amounts of vapor from the brine flow upon entry to each stage, and by its continuous condensation at the free surface of converted water in the adjacent trays.

In order to indicate in detail the essence of my invention and the way in which it can be applied, I shall describe the following embodiment thereof. It is understood, however, that the invention can be applied in various other sea water flash distillation processes and for other industrial applications.

FIGURE 1 is a diagrammatic elevation view of a flash evaporator-condenser, designed for the following approximate range of brine temperatures: brine inlet temperature, 80° C.; brine outlet temperature, 20° C.

FIGURE 2 is a diagrammatic plan view of this flash evaporator-condenser.

FIGURE 3 is a diagrammatic cross section along line A—A in FIGURE 1.

FIGURE 4 is a diagrammatic cross section along line B—B in FIGURE 2.

Figure 5:
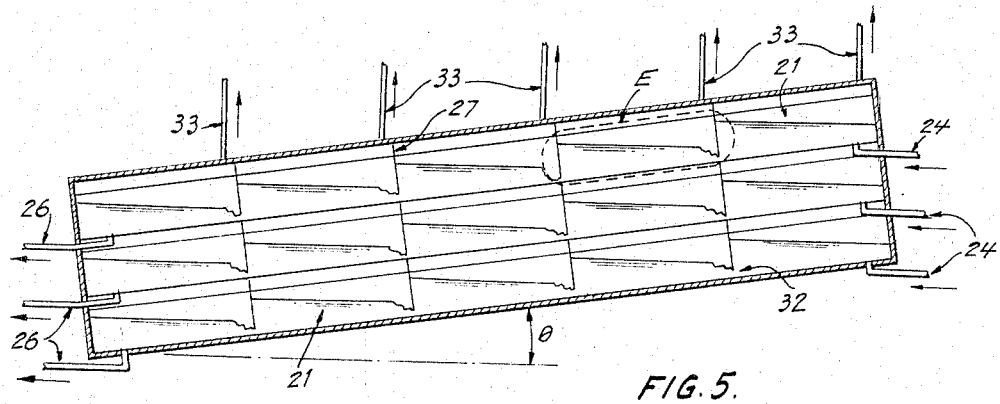
FIGURE 5 is a diagrammatic cross section along line C—C in FIGURE 2.

Referring to the drawings, cold converted water is admitted through pipes 24 to the upper end of converted water trays 21. It flows downwards in these trays, penetrating from stage to stage through slots 32 in the transversal partitions 27, and sealing thereby these slots. It finally emerges from the lowest stage through pipes 26.

A low pressure is maintained in each stage by connecting them through pipes 33 to some evacuating means, e.g. a steam ejector. Any non-condensible gases are thus substantially removed, and the pressure in each stage corresponds approximately to the vapor pressure of the warmest water present in that stage.

A stream of warm brine is admitted through pipes 25 to the lowest end of brine trays 22. When the brine reaches the slots 34 in the transversal partition plates 27 between the lowest two stages, the lowest stage becomes hermetically sealed off from the other stages and brine penetrates into the second stage, to a higher free surface level than in the first stage, due to the difference in vapor pressure in these two locations.

Brine continues thus to penetrate and rise from stage to stage, against gravity, until it reaches the uppermost stage and leaves through pipes 23.

Vapor is flashed off from the brine stream immediately after penetration into each new stage. This vapor migrates to the free surface of water in the adjacent converted water trays and is condensed upon contact with such surface. A steady mass and heat transfer is thus established between counter flowing streams of brine and converted water in each stage.

In the embodiment of my invention as described herein the flash evaporator-condenser is built of 12 piles in series, numbered 9 to 20, each pile consisting of an enclosure divided by partition plates 27 into five stages in series. Each pile enclosure is set at an appropriate angle to the horizon, so as to permit the use of relatively shallow trays without danger of overflow.

In order to increase the free surface areas of flows, a multiplicity of layers of trays are used in each enclosure. In each layer trays carrying converted water alternate with brine carrying trays. In the described embodiment of the invention, there are 3 levels of trays, each one containing 2 brine trays and 2 converted water trays.

The number of layers of trays is limited by the height of enclosures, by the height of trays and by the vertical distance between trays. We are interested to reduce the height of trays as much as possible without encountering overflow from trays, thereby increasing the permissible number of layers for a given enclosure height. It is of interest, therefore, to keep flows in trays as shallow as possible.

Such shallow streams are also advantageous from the point of view of efficient heat transfer between streams.

Figure 6:
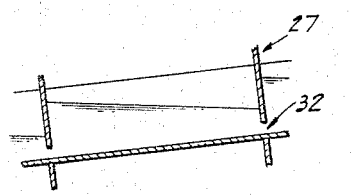
FIGURE 6 is an enlarged detail "D" of FIGURE 4 and/or detail "E" of FIGURE 5.

FIGURE 6 illustrates a simple design of slots between stages. By the alternative slot design shown in FIGURE 8, a liquid seal is obtained with less loss of hydraulic head. Shallower streams are obtained with this arrangement.

Figure 9:
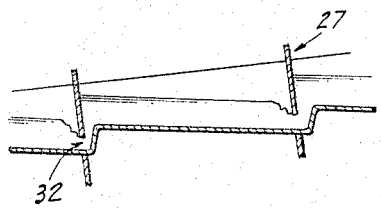
FIGURE 9 is another alternative enlarged detail "D" of FIGURE 4 and/or detail "E" of FIGURE 5.

Even shallower streams are obtained by shaping the tray bottom in a step form, as shown in FIGURE 9.

When vapor condenses at the free surface of the converted water stream, a temperature gradient is set up between this free surface and the bottom of the stream, the free surface being at a somewhat higher temperature due to release of heat of condensation. Since at the practical temperatures of operation, water density decreases with increase in temperature, water at the free surface is then less dense than water below the surface. A laminar flow would remain stable under these conditions, and without recourse to some artificial mixing means, such as those proposed in my Israel patent application Nos. 19,320 and 19,321 of May 30, 1963, the heat transfer to the bulk of converted water will certainly be the rate controlling factor of the whole process.

The tray design illustrated in FIGURE 9 is therefore particularly suitable for the construction of converted water trays.

Figure 8:
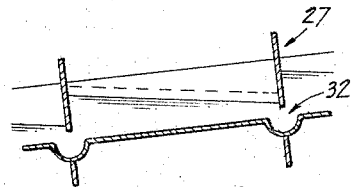
FIGURE 8 is another alternative enlarged detail "D" of FIGURE 4 and/or detail "E" of FIGURE 5.

On the other hand, there is a certain advantage in the simple inclined bottom tray designs of FIGURES 6 and 8 for the construction of trays carrying brine. There we are interested to impede violent eruption of vapor bubbles from the brine stream, both in order to conduct the process in a manner resembling a reversible process, and in order to reduce mist formation and carryover to a minimum. With a brine tray design as shown in FIGURE 6 or 8, vapor bubbles will form and be liberated from the brine stream gradually, over the whole stage length, due to the considerable hydrostatic pressure at the tray bottom, which is reduced only gradually in the direction of brine flow.

Figure 7:
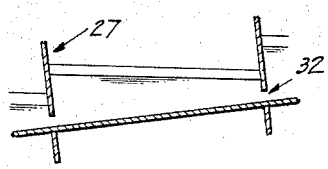
FIGURE 7 is an alternative enlarged detail "D" of FIGURE 4 and/or detail "E" of FIGURE 5.

For good performance of heat and mass transfer, it is desirable to keep the barriers in the path of vapor from free surface of brine streams to free surface of converted water streams as small as possible. The trays illustrated in FIGURE 7 are provided with side walls with upper edges trimmed to be essentially parallel to the free surface of streams, thereby reducing the obstacles in the way of vapor between adjacent streams.

Figure 10:
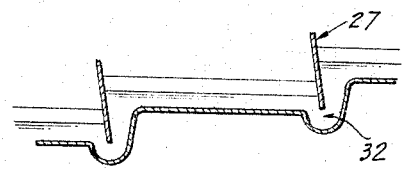
FIGURE 10 is still another alternative enlarged detail "D" of FIGURE 4 and/or detail "E" of FIGURE 5.

FIGURE 10 shows a construction which incorporates simultaneously all these improvements.

The bottom stage of a flash evaporator-condenser carries the hottest streams in the plant. When a plant is designed to operate with the same brine temperature drop between each two consecutive stages, the stream level difference will be highest between the two lowest (i.e. hottest) stages. These extreme stages control then the vertical dimension of all the pile enclosures, so that the enclosure volume of piles containing cooler stages will be inefficiently utilized.

From this point of view, it is more advantageous to build the different stages of different length, with stages carrying hot water being shorter than those carrying cool water. The brine temperature drop will thus be smaller between consecutive stages in the lower parts of the plant than in its higher parts, and the volume of all the pile enclosures will be more efficiently utilized.

For very large scale plants the flash evaporator-condenser can be built in the form of an integral construction, i.e., all the stages may be housed in one common long enclosure, built on site, preferably with rectangular cross sections and with floor and ceiling surfaces of curved profile, shaped so as to offer appropriate inclinations for the trays in different stages.

My invention can also be successfully applied to flash distillation plants utilizing the temperature difference occurring between ocean water at the surface and in deeper layers. This temperature difference is, however, not constant. It exhibits a seasonal variation, being highest during summer. For such application, by-passes are introduced, which allow outflow of brine from the flash evaporator-condenser system at stages below the top stage and admission of cool converted water at such lower stages. Such bypass operation may be effected manually, or, more preferably automatically, in response to variations of certain magnitude in temperature of incoming brine.

What I claim is:

1. A direct contact flash evaporator-condenser composed of a multiplicity of chambers, each of said chambers forming at least one stage of said evaporator-condenser arranged in series, a plurality of trays for brine flow and a plurality of trays for converted water flow, each said tray extending substantially the length of one of said chambers, said plurality of trays for brine flow being connected in series with one another by brine carrying channels through partitions between said stages, said plurality of trays for converted water flow being connected in series with one another by water carrying channels through partitions between said stages, said stages being hermetically sealed off from the outside atmosphere and from each other, except for narrow slots at the position of penetration of said channels through said partitions, said stages and said channels being positioned in directions inclined to the horizontal, said channels being arranged at a higher vertical location as the brine flows from a higher vapor pressure stage to the next lower vapor pressure stage so that hot brine entering into said brine carrying channels at the lowest stage advances upwards from stage to stage against gravity, under the influence of the vapor pressure difference between consecutive stages, sealing off the slots between said stages in said brine channels, emerging cooled from the uppermost stage, and cold converted water entering into said water carrying channels at the uppermost stage flows downwards from stage to stage by gravity and against the pressure differences between consecutive stages, sealing off the slots between said stages in said water carrying channels and emerging heated from the lowest stage, said brine flow being cooled progressively from stage to stage by flash evaporation, said converted water flow being heated progressively by condensation of the amounts of vapor flashed off from the brine in each consecutive stage, said pressure differences between consecutive stages corresponding to different brine temperatures in said consecutive stages.

2. The flash evaporator-condenser of claim 1, in which the different stages are of different length, stages through which hotter streams flow being shorter than stages through which cooler streams flow.

3. The flash evaporator-condenser of claim 1 in which part of the lower stages are bypassed by both brine and converted water streams, the number of bypassed stages being determined by the temperature of warm brine supply.

4. In a flash evaporator-condenser according to claim 1, trays with upper edges of their side walls essentially horizontal between consecutive transversal partitions between stages.

5. In a flash evaporator-condenser according to claim 1, trays with bottoms depressed near the planes of partition between stages, said partitions partially penetrating into depressed bottom regions, thus defining depressed slots between said tray bottoms and said partitions, said slots being permanently sealed by fluid.

6. In a flash evaporator-condenser according to claim 1, trays with essentially zig-zag shaped bottom profile, defining a step shape sequence for the consecutive stage bottoms.

7. A device according to claim 1 wherein non-condensable gases are removed from said stages.

References Cited

UNITED STATES PATENTS

| 3,142,381 | 7/1964 | Ris et al. | 202—173 |
| 3,155,600 | 11/1964 | Williamson | 207—173 X |
| 3,160,571 | 11/1964 | Mulford et al. | 207—173 |
| 3,161,558 | 12/1964 | Pavelic et al. | 207—173 X |
| 3,192,131 | 6/1965 | Loebel et al. | 207—173 |
| 3,219,553 | 11/1965 | Hughes | 201—11 X |
| 3,219,554 | 11/1965 | Woodward | 202—173 |
| 3,243,358 | 3/1966 | McCue | 203—10 |
| 3,248,307 | 4/1966 | Walford | 203—11 |
| 3,275,532 | 9/1966 | Harper | 202—185 X |

FOREIGN PATENTS

| 822,001 | 10/1959 | Great Britain. |

NORMAN YUDKOFF, *Primary Examiner.*
F. E. DRUMMOND, *Assistant Examiner.*